(12) United States Patent
Yumoto et al.

(10) Patent No.: US 7,813,299 B2
(45) Date of Patent: Oct. 12, 2010

(54) SESSION CONTROL SYSTEM FOR HIERARCHICAL RELAYING PROCESSES

(75) Inventors: Kazuma Yumoto, Fuchu (JP); Takashi Miyamoto, Yokohama (JP); Tatsuhiko Miyata, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1683 days.

(21) Appl. No.: 11/025,973

(22) Filed: Jan. 3, 2005

(65) Prior Publication Data

US 2005/0281251 A1 Dec. 22, 2005

(30) Foreign Application Priority Data

Jun. 21, 2004 (JP) ............................. 2004-181989

(51) Int. Cl.
*H04L 12/28* (2006.01)
(52) U.S. Cl. ..................... 370/254; 370/231; 370/352; 709/203; 709/242
(58) Field of Classification Search ................ 370/231, 370/254, 352; 709/203, 242
See application file for complete search history.

(56) References Cited

U.S. PATENT DOCUMENTS

| | | | |
|---|---|---|---|
| 7,441,045 B2* | 10/2008 | Skene et al. ................. | 709/241 |
| 2002/0073211 A1* | 6/2002 | Lin et al. ..................... | 709/229 |
| 2003/0067923 A1* | 4/2003 | Ju et al. ..................... | 370/395.3 |
| 2004/0086102 A1* | 5/2004 | McMurry et al. ........... | 379/219 |
| 2006/0047960 A1* | 3/2006 | Ono et al. .................... | 713/171 |

FOREIGN PATENT DOCUMENTS

JP 5-260094 3/1992

OTHER PUBLICATIONS

Tomohiko Suzuki et al., "A Proposed Multi-Stage Hierarchical Type SIP Server System 4J-02":, The 64th information processing society of Japan (2002) conference (IPSJ), 2002, pp. 3-471-3-472, in Japanese with English translation.*
J. Rosenberg et al., "SIP: Session Initiation Protocol", Network Working Group (Jun. 2002), 85 pages.*

* cited by examiner

*Primary Examiner*—Melur Ramakrishnaiah
*Assistant Examiner*—Yosef K Laekemariam
(74) *Attorney, Agent, or Firm*—Stites & Harbison PLLC; Juan Carlos A. Marquez, Esq.

(57) ABSTRACT

Disclosed here is a method for sending/receiving a message through a session control server disposed in each of hierarchical layers of a network system having a hierarchical structure. To achieve the above object, each of the session control servers is provided with operation mode confirming means for confirming a set operation mode and fixed destination solution means for setting an address so as to relay each received message to a specific address in accordance with the set operation mode. The session control server is also provided with location solution means for registering/managing a public address to be opened to external by a user and a user address given in the sub-domain to which the user belongs actually. Because a parent domain address can be used as an address to be opened to external for operating the session control server, the problems to occur due to a change of the user belonging sub-domain can be hidden from external and the parent domain can manage message traffics collectively.

10 Claims, 9 Drawing Sheets

| PUBLIC ADDRESS | USER NAME |
|---|---|
| ua2@domainB.com | ua2@sub1.domainB.com |
| ua3@domainB.com | ua3@sub2.domainB.com |
| : | : |

82

| USER NAME | CONTACT ADDRESS |
|---|---|
| ua2@sub1.domainB.com | 192.168.1.100: 5060 |
| ua3@sub2.domainB.com | 192.168.1.200: 10120 |
| : | : |

SESSION CONTROL SYSTEM FOR HIERARCHICAL RELAYING PROCESSES

CLAIM OF PRIORITY

The present application claims priority from Japanese application JP 2004-181989 filed on Jun. 21, 2004, the content of which is hereby incorporated by reference into this application.

FIELD OF THE INVENTION

The present invention relates to a technique for enabling a system that controls and manages sessions to determine the destination to relay each received message, more particularly to a technique for relaying each received message to a fixed address regardless of the address described in the message.

BACKGROUND OF THE INVENTION

A communication network is usually structured hierarchically. For example, each of the present telephone networks is structured hierarchically so that a line switchboard that handles subscribers' terminals intensively is provided at the end of the network and a host line switchboard is used to control a plurality of such terminal end line switchboards. In addition, another higher ranking host line switchboard is used to control such host line switchboards. Such a hierarchical network that uses telephone switchboards is disclosed, for example, in the official gazette of JP-A No. 260094/1993.

On the other hand, in recent years, a session control server (so-called SIP server) is employed widely to construct an IP network. The session control server is a nominal name of servers, each of which has both of the SIP proxy function and the SIP registrar function. The SIP proxy server and the SIP registrar are defined together with the details of the SIP (Session Initiation Protocol) in the RFC3261 ruled by the IETF (Internet Engineering Task Force).

Conventionally, the SIP proxy server, when receiving a request message, checks whether or not it is sent to a domain or address for which the SIP proxy server itself takes the responsibility. If the message is not sent to such a domain or address, the SIP proxy server solves the destination address through searching in the DNS (Domain Name System) in accordance with the RFC3263, then relays the message to the destination address.

On the other hand, if the message is sent to a domain or address the SIP proxy server is required to take the responsibility, the SIP proxy server obtains the address information of the destination terminal from the location service created by the SIP registrar and solves the destination address to relay the message.

The location service information managed by the SIP registrar is registered from a terminal with use of a REGISTER message. The SIP registrar manages a pair of a user name (Address-of-Record) given to a user uniquely and a real address of the terminal used by the user.

[Patent Document 1] Official Gazette of JP-A No. 260094/1993 [Non-patent document 1] RFC3261 "Session Initiation Protocol" (SIP), June, 2002.

A message determination logic used in each conventional hierarchical type network premises that messages are always flown from a management unit of a parent network to a management unit of a sub(child)-network regardless of the network type (any of telephone networks and other communication networks). The standard of the SIP registrar defined in the non-patent document 1 is based on a communication model referred to as an SIP trapezoid type one. It is expected that there are only two SIP servers used for relaying messages between terminals. Consequently, if the conventional technique disclosed in the non-patent document 1 is employed to construct a hierarchically structured network, messages come to be exchanged directly between SIP servers that manage their sub-domains. This is why it is required to develop another determination logic for relaying messages to avoid that problem. Such a determination logic for relaying messages is thus complicated very much, thereby controlling of the network comes to be complicated, as well. This has been a problem of the conventional technique. In addition, because messages are exchanged directly between SIP servers that manage their sub-domains, the SIP server for managing a parent domain cannot detect what messages are exchanged between SIP servers of sub(child)-domains placed under its management. This has been another problem of the conventional technique.

SUMMARY OF THE INVENTION

Under such circumstances, it is an object of the present invention to provide a method for relaying messages between session control servers that manage different domains by passing them at least once through a session control server that manages the highest domain in the hierarchical structure. It is another object of the present invention to provide a control server that can use the method.

It is still another object of the present invention to provide a method for receiving messages from an external network through a control server that manages the highest domain in the receiver side network hierarchical structure at least once. It is still another object of the present invention to provide a control server that can use the method.

In order to achieve one of the above objects, in the present invention, the control server that manages communication sessions is provided with fixed destination solution means for setting a specific destination address to which each received message is to be relayed. Consequently, each message sent from a control server disposed in a sub-domain is passed at least once through a control server belonging to the highest domain in the network hierarchical structure.

In that connection, the control server should preferably be configured to be operated in two operation modes; one mode is used to relay each received message to the address described in the message and the other mode is used to relay all the received messages to a specific addresses regardless of the addresses described in those messages. And, according to any of the operation modes, the control server should preferably be operated so as to change the message destination. This is because the control server often comes to receive messages that are not required to be relayed to the parent domain control server in actual operations. If the control server is configured to be operated in those two operation modes, the control server is prevented from relaying unnecessary messages to the parent domain control server. In addition, the control unit can keep the configuration whether it is disposed in a parent domain or in its sub(child)-domain. The server manufacturing cost, as well as the network construction cost can be reduced significantly. However, if the control server is just provided with the fixed relay destination solution means as described above, the present invention comes to solve one of the conventional problems in principle.

Furthermore, an address given in a parent domain or sub (child)-domain is opened as a public address. And, if an address given in a sub-domain is opened such way, the DNS is set so that the sub-domain address solution result is assumed as the real address of the parent domain server. Consequently, each message received from an external network comes to be passed at least once through the control server of the highest domain in the network hierarchical structure.

As described above, the fixed destination solution means provided in each session control server sets a destination address to relay each received message to a specific address. This is why each message issued from each sub-domain user terminal can be relayed to the destination through the session control server provided in the parent domain from the session control server provided in the sub-domain.

Furthermore, the location solution means registers/manages public addresses opened by users and user addresses given in the actual users' belonging sub-domains as described above. Consequently, the session control server provided in a parent domain, when receiving a message from an external network system, can relay the received message to a proper sub-domain session control server.

BRIEF DESCRIPTION OF THE DRAWINGS

FIG. 8 is a table for describing an example of a location service information management table;

DETAILED DESCRIPTION OF THE PREFERRED EMBODIMENTS

Comparative Example

At first, a hierarchical network formed with conventional SIP servers will be described in detail with reference to FIG. 9 to compare it with that of the present invention.

Figure 1:
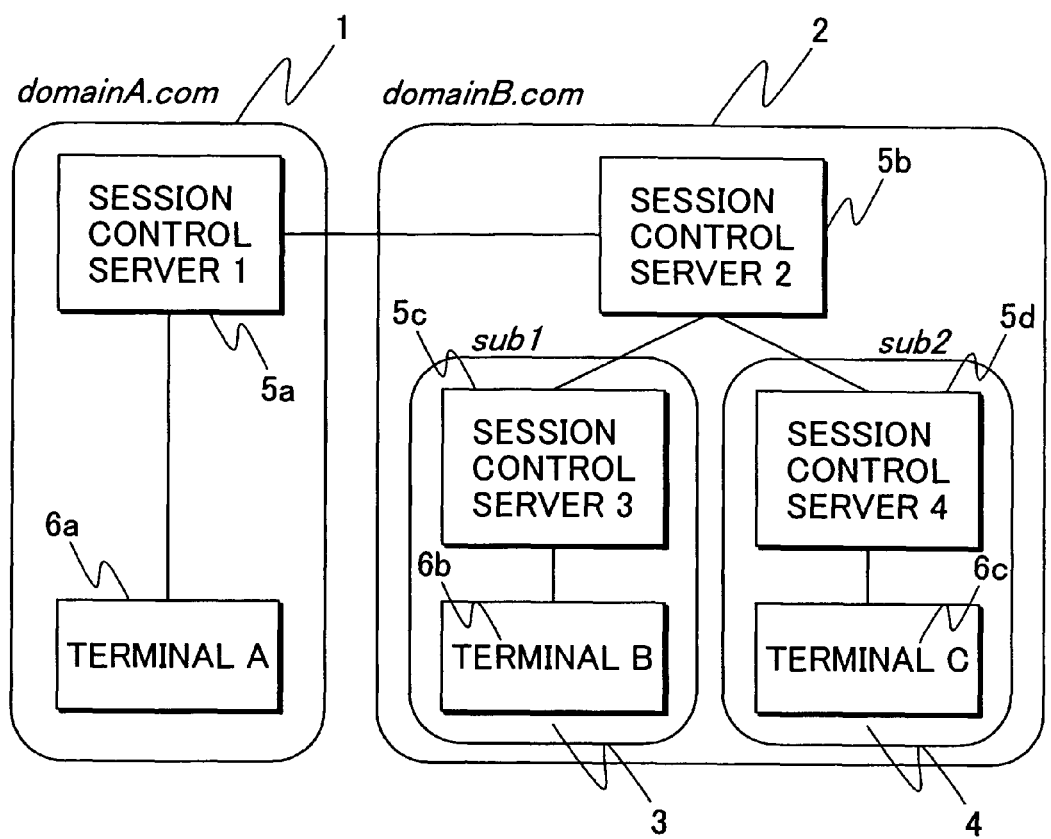
FIG. 1 is a block diagram of a hierarchical session control system in an embodiment of the present invention.
Figure 9:
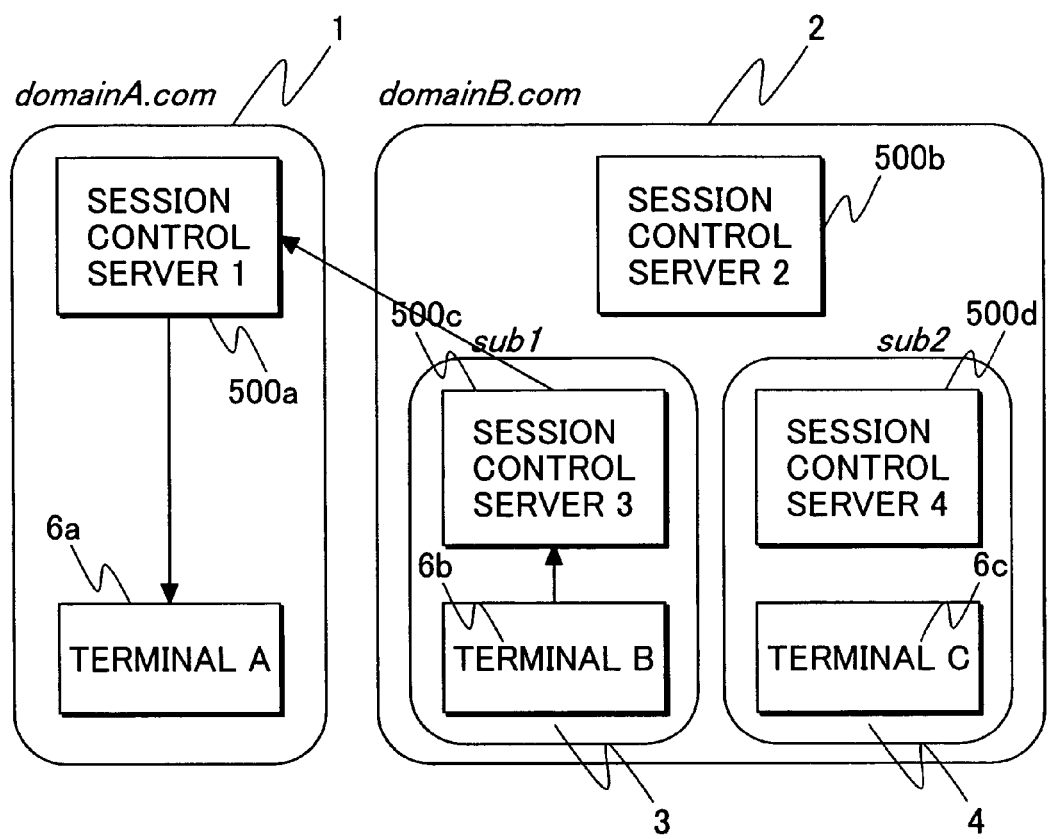
FIG. 9 is a block diagram for describing how to relay a message in a hierarchical system formed with conventional session control servers.

FIG. 9 shows an example of a message flow in a session control system shown in FIG. 1, which is configured by the conventional session control servers (500a to 500d). A request message issued from a terminal B (6b) of a sub-domain 1(3) to a terminal A (6a) of a domain A(1) is received by a session control server 3(500c) that manages the terminal B. Receiving the message, the session control server 3 certifies the message as needed, then solves the target address to which the message is to be relayed.

In each conventional session control server, the target solution unit checks whether or not the request is addressed to a domain managed by its control server. If the check result is YES (addressed), the server 3 obtains the address information of the destination terminal from the location service created by the registration server to solve the IP address, then relays the message to the destination. If the check result is NO (not addressed), the server 3 searches in the DNS to solve the destination domain IP address, then relays the message to the destination. The terminal A, since it belongs to the session control server 1(5a) provided in the domain A, usually comes to have a public address like "sip:userA@domainA@com" given to the user A who uses the terminal A.

And, addresses in the format are used as the request messages sent from the terminal B to the user A. However, if the session control server 3(5c) determines that a received message is addressed to a domain it does not manage and searches in the DNS to solve the domain IP address and relay the message to the destination, the message is relayed directly to the session control server A(5a) of the domain A, not through the parent domain session control server 2(5b).

First Embodiment

FIG. 1 shows a block diagram of a hierarchical session control system in this first embodiment. The hierarchical session control system consists of two domains; a domain A(1) and a domain B(2). The domain A(1) includes a user A and a terminal 6a of the user A while the domain B(2), which differs from the domain A, consists of a sub-domain 1(3) and another sub-domain 2(4). The sub-domain 1(3) includes a user B and a terminal 6b of the user B while the sub-domain 2(4) includes another user C and a terminal 6c of the user C. A domain mentioned here means a logical set of network devices (terminals, servers, etc.) provided on a network and a sub-domain means part (a unit) of a domain, which is obtained by dividing the domain logically.

In this embodiment, a domain positioned in the layer just above that hierarchically, when it is viewed from its sub-domains, is referred to a parent domain and each domain positioned in the layer just below that hierarchically is referred to as a child domain when it is viewed from its parent domain. In other words, both of the sub-domains 1(3) and 2(4) are child domains when they are viewed from the domain B(2) and the domain B is a parent domain when it is viewed from the sub-domains 1(3) and 2(4). A sub-domain is further divided logically. In this embodiment, such a divided sub-domain is referred to as a grandchild domain for convenience.

Each of parent domains and child domains is provided with a session control server (one of 5a to 5d) used to relay session control information to establish and control a communication session for sending/receiving audio and video data, relay presence information that is state information of both of a user and a user's terminal, and relay text information to be send/received as IM (Instant Message) information and through chatting. Those session control servers (5a to 5d) may relay only session control information and do not relay presence and text information. In FIG. 1, the solid lines between the terminal A(6a) and the terminal B(6b) through the session control server 1 (5a), the session control server 2 (5b), and the session control server 3 (5c), as well as the solid lines between the terminal A(6a) and the terminal C(6c) through the session control server 4(5d) are control signal lines through which control signals are passed to control sessions. The control signal lines may be taken as connections formed on an IP (Internet Protocol) network. In this embodiment, the "session" means a series of communications between terminals; a session begins with a communication starting message and ends with a communication ending message.

In this embodiment, the address given to the parent domain control server 5b or the address given to a sub-domain control server 5C or 5*d* is premised to be opened to the terminals A(6*a*), B(6*b*), and C(6*c*) as a public address. This is to enable messages issued from the terminal A of the domain A to be received by the control server 5*b* provided in the parent domain. If an address given in a sub-domain is to be opened as a public one, the DNS server disposed on the network is set so that the address solution result in the sub-domain denotes the parent domain's real address. In that connection, the DNS server is disposed, for example, in a place of the domain B, which is enabled to communicate with an external domain (network), for example, a place located in parallel to the control server 5*b*.

The DNS server is not necessarily enabled to be accessed from the devices provided in the corresponding domain B. It is rather important that the DNS server is accessed from external domains. Therefore, the DNS server may be provided outside the domain B. In that case, however, if maintenance of all the control servers in the domain B is done by a service engineer/company, the DNS server should preferably be provided in the domain B. This is to set the internal configuration of the domain B in the DNS server for reasons of easier maintenance. If the DNS server is to be registered/managed by a person/company outside the domain B, the DNS server is provided outside the domain B. For example, the DNS server is avoided to be provided in the company, and it is registered/managed by the ISP or the like.

Figure 2:
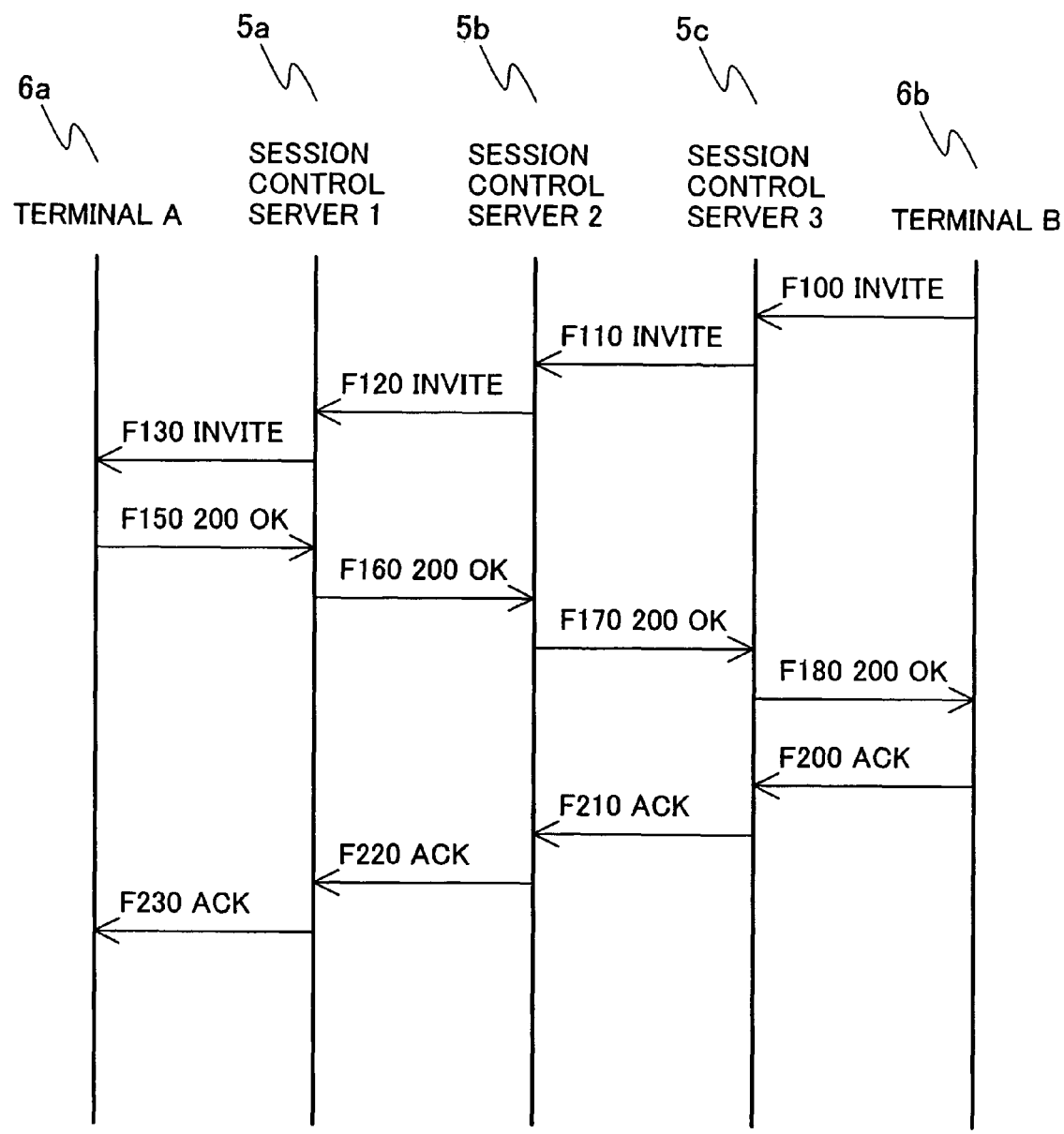
FIG. 2 is a sequence chart for describing an example of processes for relaying a message issued from a sub-domain terminal.

FIG. 2 shows a request message flowing sequence in this first embodiment when the message is issued from the terminal B(6*b*) of the sub-domain 1(3). The sequence example is obtained by simplifying a 3-hand-shake model in such a session as an SIP INVITE one. The destination target determination logic used in session control servers is similar to that of a model in which a transaction is completed by one-round operations of request and response in such a session as a MESSAGE one.

A request message sent from the terminal B(6*a*) to the user A is received first by the session control server 3(5*c*) that manages the terminal B (F100). Each session control server is newly provided with a mode for solving each destination in a conventional way and a mode for fixing a destination so as to relay messages fixedly to a session control server provided in a parent domain. If a session control server is provided in a sub-domain like the session control server 3, the destination fixing mode is set for operating the server. Receiving the request message from the terminal B, the session control server 3 confirms that the request is not addressed to any domains it manages, then relays the request message to the session control server 2(5*b*) provided in the parent domain (F110).

The reason why each session control server is provided with two operation modes such way is to take how the control server will operate actually into consideration. In other words, a control server is actually operated so that an operation mode is set when the control server is started up and the set mode is continued until the server stops. And, a control server often receives messages that are not required necessarily to be relayed to the parent domain session control server. This is why the control server is configured in advance to enable both of relay destination solving and relay destination fixing processes. When relaying a message between sub-domain servers without passing it through any parent server, the destination terminal address to be specified at that time is not a public address given by the parent domain control server 5*b*, but it is an address given by a sub-domain control server just like a telephone operation by an extension number.

For the operations of the session control server 2 provided in a parent domain and/or session control server 1(5*a*) provided in the domain A, the relay destination solution mode is set as conventionally. The session control server 2, when receiving a message relayed from the session control server 3, solves the destination domain IP address, for example, by searching it in the DNS and relays the message to the session control server 1 (F120), since the message is not addressed to any domains it manages. Receiving the message relayed from the session control server 2, the session control server 1 obtains the address information of the destination terminal from the location service created by the registration server, then relays the message to the terminal A(6*a*), since the message is addressed to a domain it manages.

Processes for relaying a response between F150 and F180 are executed as conventionally in accordance with the content of the Via header inserted/set in the response message in each step of the request relay operation. In case of the processes for relaying a request between F110 and F130, a Record-Route header is inserted/set in the request message just like the Via header so that the session control server functions as a server for loose routing. Consequently, the messages relayed in the same dialog just like the request relayed between F100 and F130 are passed through a route solved for the request relaying between F100 and F130 in accordance with the content of the Route header.

Hereunder, this message relaying mechanism will be described in detail with reference to a block diagram of the session control server 5 shown in FIG. 3. The session control server 5 comprises a network interface 13 for connecting the server 5 to a network, a communication control unit 31 for analyzing each packet received through the network interface 13 and shaping and sending header information required to relay/send messages to a destination, a certification determination unit 21 for determining whether to certify each message according to the message type/source information, a certification unit for certifying each message if the certification determination unit 21 determines "certification required" for the message, a routing check unit 29 for checking whether or not a relay route is specified in each received message, a route preset message processing unit 27 for processing each message in which a Route header is specified just like request and response messages in which a via-route is set respectively, a destination determination unit 23 for determining the destination of each message in which no via-route/Route header is specified, a location solution unit 34 for solving each destination address by searching the location service created by a registration server if a received message is addressed to any domain it manages, a destination address solution unit 35 for solving each destination address by searching it in the DNS if the received message is addressed to a domain it does not manage, a session state management unit 32 for managing the state of each session, and a timer management unit 33 for managing the information registered in the location service and the effective period of each session managed by the session state management unit 32.

Generally, a "message" is defined as predetermined data included in the body part of each packet. In this embodiment, however, unless otherwise specially notified, both "packet" and "message" are defined synonymously.

Each functional block described above is required to realize functions of a proxy server of an SIP (RFC3261). Conventionally, the determination logic built in the destination determination unit 23 is effective only to determine whether or not a received request is addressed to itself (to require a self-addressed processing 24) or to another destination (to require an another-addressed processing 25). In this embodiment, however, each control server has a built-in logic for determining whether to execute a destination fixing processing 26 for relaying each received message to a fixed address regardless of the address set in the received message, as well as a fixed destination solution unit 36 for solving a destination address when relaying each message to a fixed address.

This is why the present invention can achieve an object that is to realize a function for relaying messages to a session control server provided in a parent domain from a session control server provided in a sub-domain. And, the reason why such a destination fixing processing is provided together with both self-address processing and another-addressed processing that are performed according to conventional techniques is as follows. The message relay processes are roughly classified into two types; self-addressed processing and another-addressed processing. In this rough classification, the destination fixing processing is included in the another-addressed processing. And, the reason why the another-addressed processing is further divided into destination fixing processing and another-addressed processing is that how to set a destination address differs between those two processes. Concretely, in the destination fixing processing, a destination address is set in a fixedly set address or address found from source address information. On the other hand, in the another-addressed processing, an address found by searching in the DNS according to already set address information is set as a destination address.

In this embodiment, the address to be given at the control server 5b of a parent domain or to be given at the control server 5C or 5d of a sub-domain is opened as a public address, so that each message sent from an external network is received by the control server of the parent domain first. Consequently, the location management unit 68 of the control server 5b provided in each parent domain has a management table for managing pairs of public addresses and user addresses. On the other hand, when opening an address given at a sub-domain control server as a public address, the DNS server that controls the sub-domain is required to be provided at a place in the network and the place is required to be accessed from outside the domain B. In addition, the DNS server is required to be set so that the real address of the parent domain server is always obtained as a result of address solution. And, the parent domain control server is required to be set so that its host file is always searched first when solving a domain name and the host file has a table of correspondence between the domain name of the control server of each sub-domain and the IP address of the domain.

Where to dispose the DNS server and control servers is determined by the design of network system, not by the internal configuration of each of the control servers. In the network 2 in this embodiment shown in FIG. 1, however, the DNS server is premised to be provided at a place to be accessed from outside the domain B. Such a network configuration makes it possible to realize a network system that enables messages issued from external networks to be received at least once through a control server set in the highest domain of the network hierarchical structure.

Receiving a message from an external network, the parent domain control server is required to relay the received message to a proper session control server provided in a sub-domain. This is why each control server is provided with built-in location solution means, that is, a location solution unit 34 for registering/managing both of a public address opened by the user to external and a user address given in the sub-domain to which the user belongs. This location solution means is indispensable to convert the destination address of each received message to a sub-domain address, as well as to solve the address of the terminal belonging to the sub-domain. Otherwise, relaying messages to the terminal is disabled. The location solution unit 34 also has a function for registering/managing a pair of a public address and a user address given from the sub-domain. This function enables messages to be relayed to each sub-domain session control server from the session control server provided in the parent domain.

Figure 3:
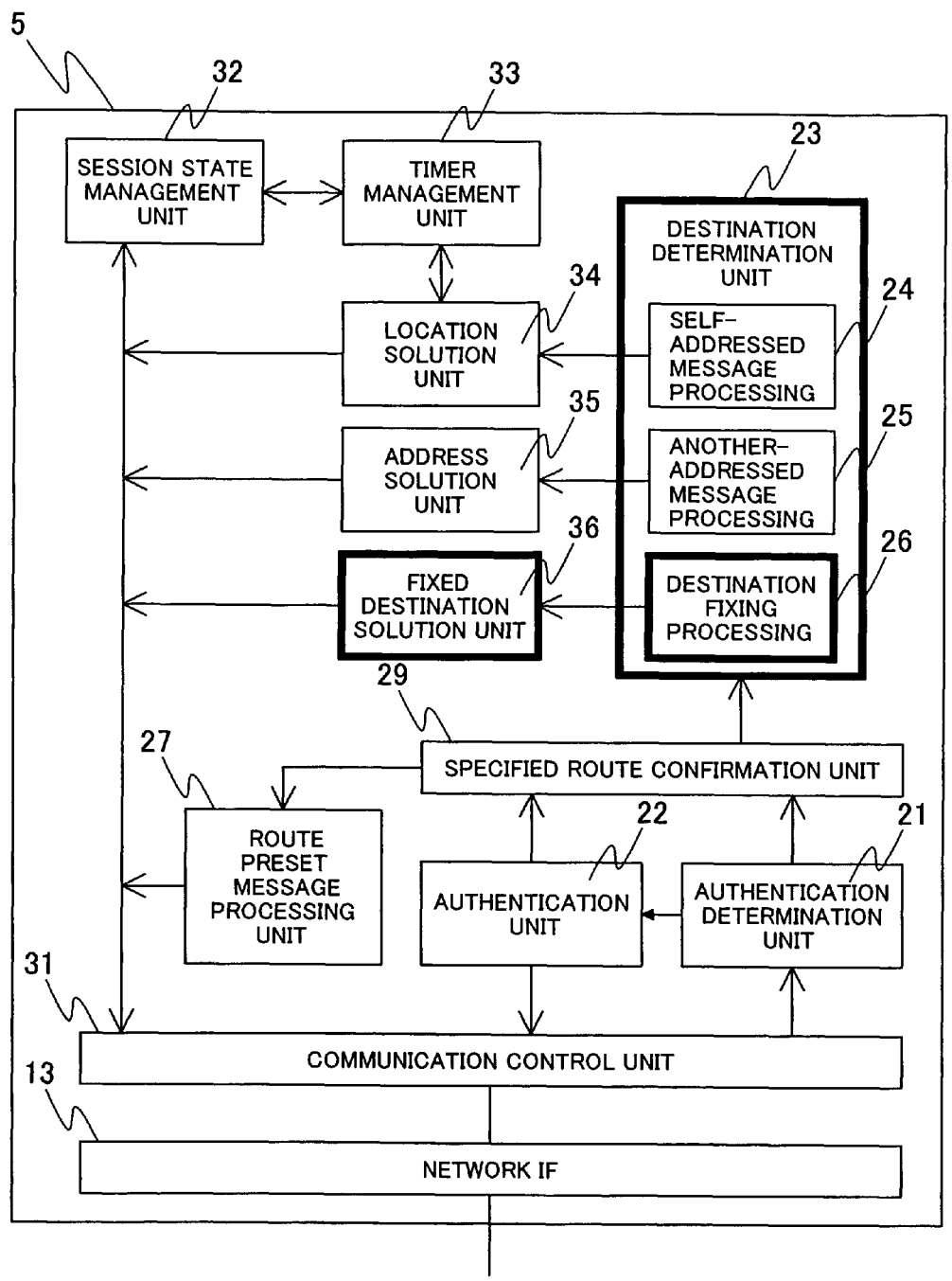
FIG. 3 is a block diagram of a session control server.

Each session control server shown in FIG. 3 includes a CPU, a memory, and a storage device, although they are not shown in FIG. 3. The control server stores a control program for executing the controlling described above in itself. When the control server is started up, the control program is loaded into the memory and executed by the CPU. The storage device may be housed in the server cabinet or provided in another cabinet as an external storage device and connected through a network. The memory or storage device stores information required for certification, information registered for location services, session state information, and fixed destination address information.

The session control server shown in FIG. 3 may also be provided with a user interface through which the user operates the server. And, the user interface may be provided with a keyboard used to input commands, a mouse used to input GUI data, a display screen, etc.

Furthermore, in this embodiment, each functional block shown in FIG. 3 is premised to be realized by a software processing. The functional block may be employed to realize the hardware configuration shown in FIG. 3 with use of its corresponding processor and signal processing circuit. The determination logic for determining whether to execute the relay destination fixing processing 26 can also be realized with the control software program installed in the server memory or any of such hardware means as a processor for the destination fixing processing 26, a signal processing circuit, etc.

Figure 4:
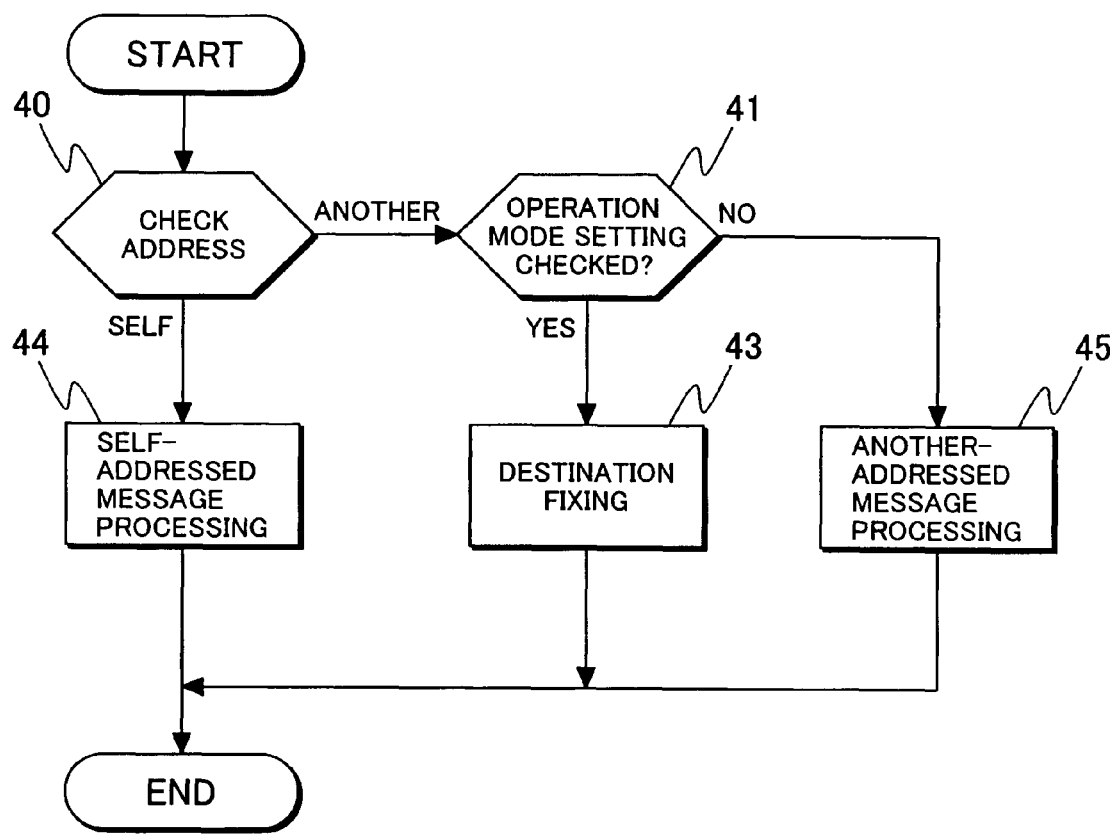
FIG. 4 is a flowchart of processes of a destination determination means.

FIG. 4 shows a flowchart of the processes performed by the relay destination determination means 23. At first, the specified route confirmation unit 29 checks the header information of each received message. If the received message is none of a response message and a request message having a Route header in which a relaying route is specified, control is passed to the relay destination determination unit 23. The unit 23 then checks the address specified in the received message (step 40). If the request message is sent to a domain or address it manages, control goes to a processing for relaying the message to the self domain (step 44). The processing is performed by the location solution unit 34. On the other hand, if the message is not sent to any domain or address it manages, control goes to an operation mode confirmation processing to confirm the set operation mode (step 41).

In step 41, the destination determination means 23 confirms the operation mode set, for example, in the process for setting an environment of the session control server to determine whether to relay the message to the fixed address of the session control server provided in the parent domain. The method for setting an operation mode through the environment setting file may be replaced with another method. For example, a command may be issued as an argument of the START command of the session control server to set such an operation mode.

If the means 23 confirms that an operation mode is already set in step 41, the means 23 regards it to be enabled to relay the message fixedly to the parent domain, thereby control goes to a destination fixing processing (step 43). If no operation mode is set yet, the means 23 relays the message to another domain (step 45) just like the conventional processing. At that time, it is also possible for the means 23 to relay all the received messages to a fixed address without setting a plurality of operation modes in the another-addressed processing. In that connection, the operation mode setting/confirming in step 41 is skipped so that control goes to the destination fixing processes in steps 40 to 43.

Figure 5:
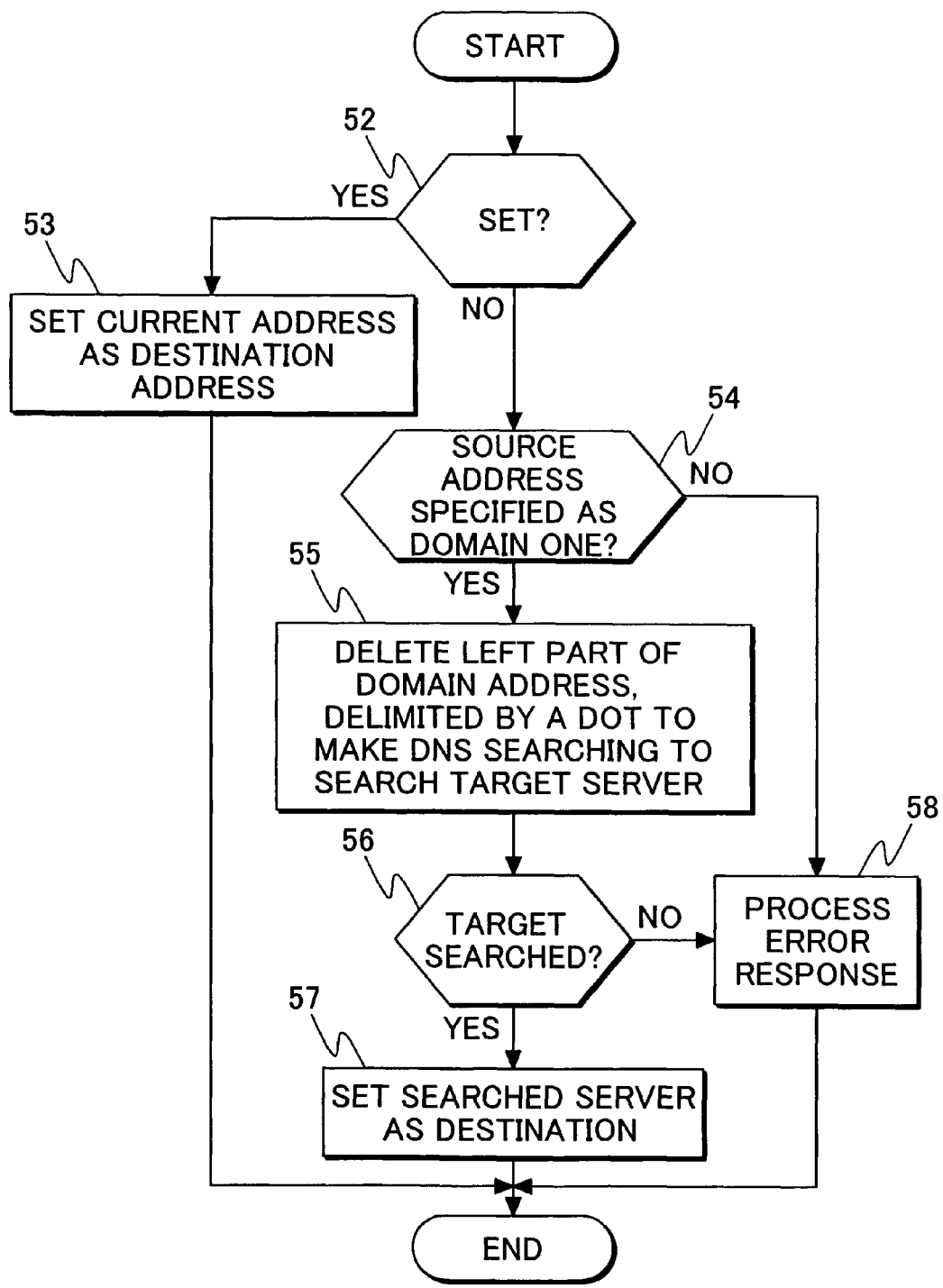
FIG. 5 is a flowchart of processes of fixed destination solution means.
Figure 6:
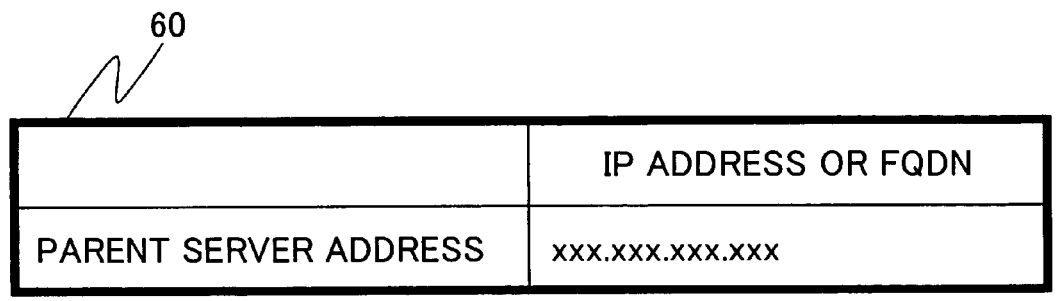
FIG. 6 is an example of how to set a fixed destination address.

FIG. 5 shows a flowchart of the processes performed by the fixed destination solution means 36. If it is determined to execute a destination fixing processing 26 as a result of the determination by the destination determination means 23, control goes to the fixed destination solution unit 36. The solution unit 36 then checks whether or not a fixed destination address is already set (step 52). If the check result is YES (set), the unit 36 specifies the set address as the destination address to relay the message (step 53). The fixed destination address is set as shown in FIG. 6, for example. Concretely, the unit 36 sets the parent server address in the environment setting file of the session control server in the IP address or FQDN (Fully Qualified Domain Name) format. If the unit 36 issues a command for setting an operation mode, the unit 36 may specify the fixed destination address as the command argument.

This is why all the received messages can be relayed fixedly to a session control server provided in the parent domain.

On the other hand, such a fixed destination address might not be set sometimes. In such a case, in the flowchart shown in FIG. 5, control goes to a processing in which the fixed destination solution unit 35 solves the destination address by itself. In that connection, the unit 36 obtains the message source address from the header information of the received message to check whether or not the address is set as a domain address (step 54). If the check result is NO (it is an IP address like "sip:ua2@192.168.1.100"), the unit 36 returns a process error response that denotes disabling of the relay processing (step 58). In the process error response processing in step 58, the unit 36 sets the error code to be returned and instructs the communication control unit 31 to return the process error response to the destination.

If the address is found to be set as a domain address like "sip:ua2@sub1.domainB.com" in step 54, the fixed destination solution unit 36 deletes the left part of the address information, which is delimited by a dot, to search the target session control server in the DNS (step 55). Concretely, if the message source address is "sip:ua2@sub1.domainB.com", the unit 36 deletes "sub1" and uses only the "domainB.com" to search in the DNS to find the target server. If the message source address is "sip:us2@termB.sub1.domainB.com" and "termB" is deleted and "sub1.domainB.com" denotes the self address, the "sub1" is also deleted and the "domainB.com" is used for searching in the DNS.

If a server is hit in the searching in the DNS in step 55, the fixed destination solution unit 36 sets the searched server address as the destination address (step 57). If not, the unit 36 returns a process error response that denotes disabling of the relay processing (step 58).

Figure 7:
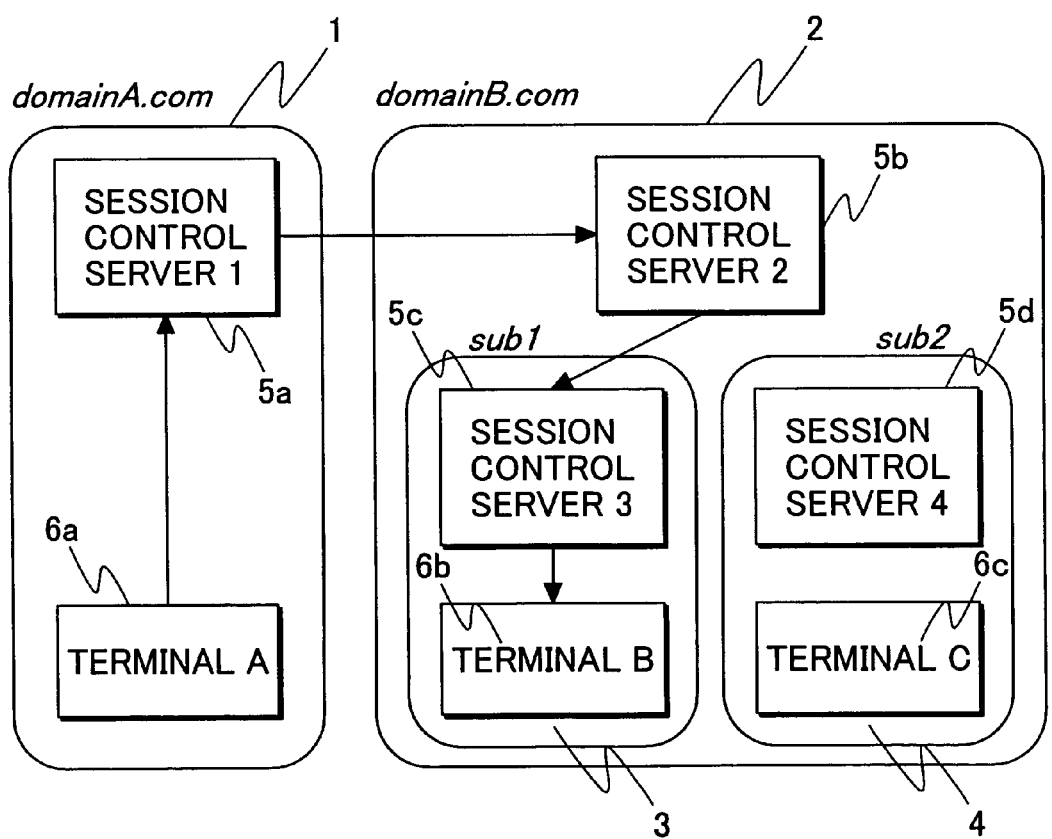
FIG. 7 is a block diagram for describing how to relay a message to a sub-domain terminal.

FIG. 7 shows an example of a message relaying flow in this embodiment when a message is received by the terminal B(6b) of the sub-domain 1(3).

Messages to be sent to the terminal B(6b) of the sub-domain 1(3) in the domain B(2) from the terminal A(6a) of the domain A(1) are received by the session control server 1(5a) that manages the terminal A first. Receiving a message from the terminal A(6a), the session control server 1 certifies the message as needed, then solves the target to which the message is to be relayed. How to determine the target destination is the same as any of the procedures described with reference to FIGS. 3 through 5. In that case, the message is not addressed to any domain the server 1 manages as a result of the check (in step 40). The server 1 then checks the set operation mode (step 41). Because the server 1 is not provided in any sub-domain, the server 1 is not required to set any operation mode. The server 1 thus relays the message to another domain as usually (step 45).

If a parent domain address is used as a public address given to a user B who uses the terminal B like "ua2@domainB.com", the address of the session control server 2(5b) found in the searching in the DNS by the destination address solution unit 35 provided in the session control server 1 is set as the destination address to relay the message.

FIG. 8 shows a configuration of a management table of location service information managed by each control server. The session control server 2 that receives messages relayed from the session control server 1 also determines a relay destination of each message just as described above. In that connection, control goes to a processing for relaying the message to the destination domain the server 2 manages (step 44), since the request message is determined to be addressed to the domain as a result of the destination check (step 40). At that time, the location solution unit 34 comes to search the necessary location service. However, if some sub-domains are provided just like the domain B to enable the domain session control server to make hierarchical relay processes, the session control server provided in the parent domain comes to operate/manage the location service information according to the specific setting unlike ordinary operation/management. Concretely, as denoted with reference numeral 80 in FIG. 8, a pair of a public address given to a user who belongs to each sub-domain and a user address given actually in each sub-domain is set fixedly as location service information for server operations.

If location service information is searched such way, the destination address comes to denote the sub-domain 1 like "ua2@sub1.domainB.com". Thus, the session control server 2 relays the message to the session control server 3. In such a message relay carried out by solving the location, the destination address is changed to an address obtained as a result of the location solution result.

The session control server 3, which receives the message relayed from the session control server 2, determines the destination similarly as described above. In that connection, because the destination address is found to be "ua2@sub1.domainB.com" as a result of the address check, the request message is determined to be addressed to a domain the server 3 manages. Control thus goes to a processing for relaying the message to the domain (step 44).

Finally, the location solution unit 34 searches the corresponding location service. If the contact address of the terminal B(3) corresponding to the address "ua2@sub1.domainB.com" is registered as denoted with reference numeral 82 in FIG. 8, the location service is found successfully and the message is relayed to the contact address.

Figure 10:
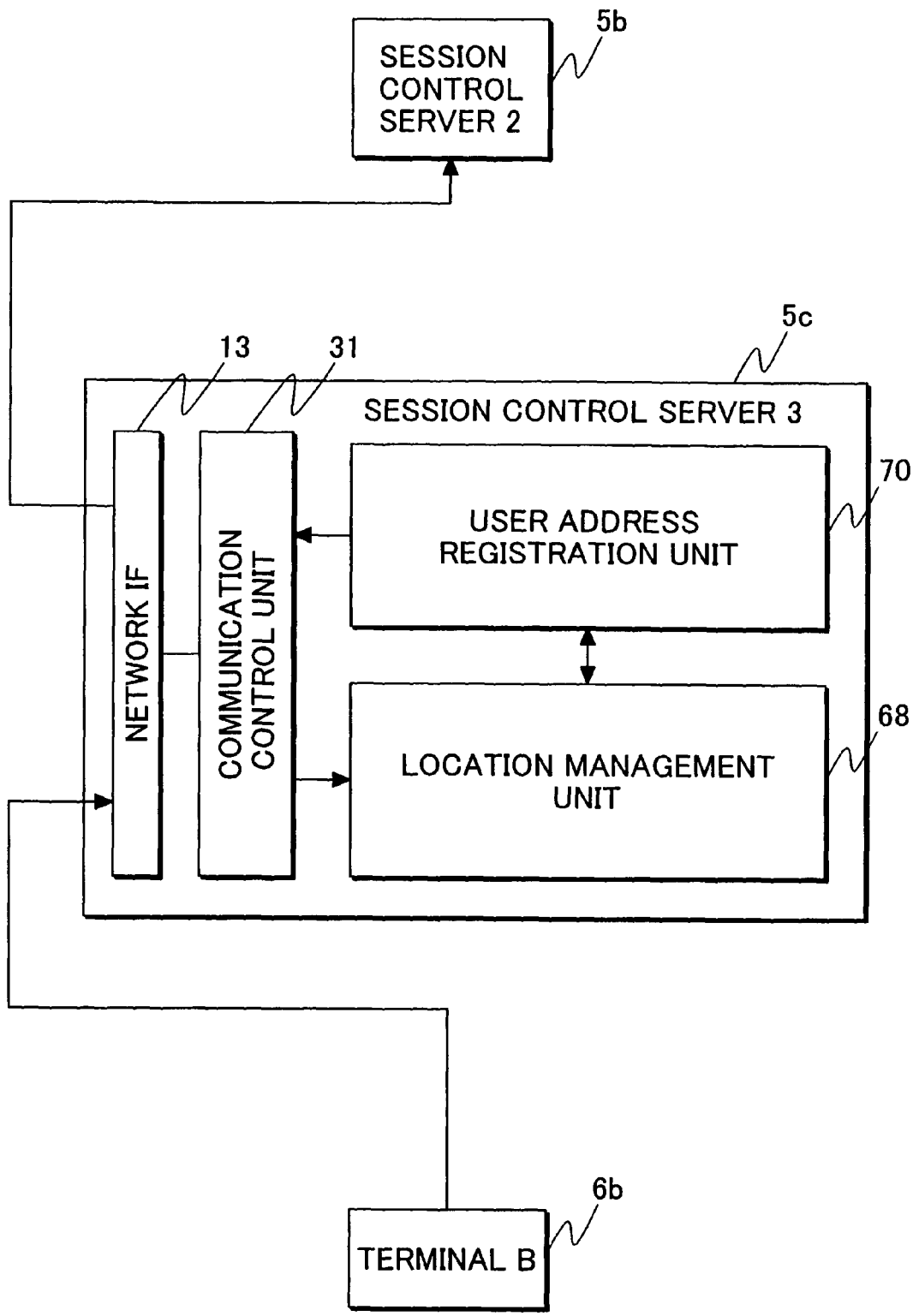
FIG. 10 is an internal block diagram of a sub-domain used to register the location service information of a parent domain automatically.

FIG. 10 shows an internal block diagram of a session control server of a sub-domain, which registers location service information of its parent domain automatically.

Concretely, the block diagram is that of the session control server 5c provided in a sub-domain and it is simplified. While the block diagram is simplified, the block diagram includes the functional blocks shown in FIG. 3.

The session control server 5c in which the correspondence between a user address and its contact address is to be registered from the terminal 6b with use of a REGISTER message includes a network interface 13 and a communication control unit 31. The server 5c thus receives the REGISTER message to register the correspondence between the user address and its contact address described in each received message as location service information in the location management unit

68. The user address registration unit 70 that monitors changes of information registered in the location management unit, when detecting such a change, sets the changed user address in the contact header, then sets the preset parent domain address as shown in FIG. 6 in the message source header as a domain name having a public address. The server 5c then registers the location service information in the session control server 5b with use of a REGISTER message.

The control server in this embodiment can also be used even in a network having a hierarchical structure consisting of more than three layers. In such a case, the location solution unit is provided in the session control server in the top layer to map the addresses with respect to the bottom layer. The address mapping method is the same as that of the session control server provided in each parent domain in this embodiment. Consequently, messages received from an external network is always passed through the session control server in each parent domain, then sent to the session control server in the destination child domain it manages. The session control server in the bottom layer fixes the destination just like the session control server in each sub(child)-domain in this embodiment. This is why messages sent from a sub-domain can always be relayed to any external network through the session control server of the parent domain even in a network having a hierarchical structure consisting of more than three layers.

The session control server provided in the intermediate layer can fix the destination for each message flowing from downstream to upstream just like the session control server provided in the above sub-domain and instruct the location solution means to make address mapping just like the session control server provided in the above parent domain. In other words, if the session control server session provided in the intermediate layer can have a destination fixing function, the session control server comes to relay messages from a grandchild domain to a child domain, then to a parent domain or from a parent domain to a child domain, then to a grandchild domain sequentially through layers even in a network having a hierarchical structure consisting of more than three layers.

As described above, each of the control servers in this embodiment makes it possible to relay each message issued from a user terminal of a sub-domain to the destination from a session control server of the sub-domain through the session control server of the parent domain.

Furthermore, the location solution means in this embodiment registers/manages each pair of a public address opened by a user and a user address given at the sub-domain to which the user belongs actually, so that the session control server of the parent domain, when receiving a message received from an external network, can relay the received message to the session control server of the target sub-domain properly.

Furthermore, if a network is formed with the control servers in this embodiment so that a session control server is provided in each layer of the network system having a hierarchical structure, messages can be sent/received through the session control server in each of those layers. Consequently, an opened parent domain address described, for example, on a business card can be used to hide problems to occur due to any change of the user sub-domain after an organization change/expansion of the server, etc. from external.

It is also possible to manage traffics of logging and accounting collectively at the session control server of each parent domain; there is no need to make such management at each of its sub-domains.

What is claimed is:

1. A network system having a hierarchical structure consisting of a set of a domain and a sub-domain, comprising:
a plurality of session control servers disposed in both of said domain and said sub-domain; and
a network used for the connection between each of said plurality of session control servers and a communication terminal;
wherein a session control server disposed in said sub-domain has means for relaying a received message to a preset fixed address regardless of the address set in said received message;
wherein said control server has means for determining whether or not the address of said received message belongs to a domain said server manages;
wherein said network system relays said received message to a session control server disposed in said domain if said address does not belong to said domain said server manages.

2. A network system having a hierarchical structure consisting of a set of a domain and a sub-domain, comprising:
a plurality of session control servers disposed in each of said domain and said sub-domain;
at least two communication terminals; and
a network used for the connection between each of said plurality of session control servers and each of said at least two communication terminals,
wherein said session control server disposed in said domain has means for determining whether or not the address of a request message belongs to a domain said server manages and relaying said request message to a proper session control server disposed in a destination sub-domain if said address belongs to said domain said server manages, said request message being relayed from another domain having no set route,
wherein said session control server disposed in said domain has means for setting a pair of a public address to be opened to external by the sub-domain user and a user address to be used locally in said sub-domain as location service information.

3. The network system according to claim 2,
wherein said session control server disposed in said sub-domain has means that, when said location service information it manages is updated, sets the user address managed by said location service information in the contact header and sets the address of the parent domain in the source header as a public address domain name, thereby registering said location service information in the session control server disposed in said parent domain with use of an SIP (Session Initiation Protocol) REGISTER message.

4. A session control server, comprising:
an interface for sending/receiving a message;
a communication control unit for receiving and analyzing a received message, then shaping the message header to be transferred to said interface;
a destination determination unit for determining whether or not the address of said received message belongs to a domain said server manages;
a fixed destination solution unit for relaying said received message to a specific fixed address; and
a location solution unit for solving the address of said message destination if the address of said received message belongs to a domain said server manages,
wherein said server relays said received message to said specific fixed address if the address of said received message does not belong to any domain said server manages,
wherein said specific fixed address is the address of another session control server disposed in a parent domain.

5. The session control server according to claim 4,
wherein said control server further includes a destination address solution unit for solving an address to relay said message by searching it in a DNS for a received message;
wherein said destination determination unit determines whether to relay said received message to a fixed address or a domain to which the address of said received message belongs if the address of said received message does not belong to any domain said server manages; and
wherein said system relays said received message to said specific fixed address if it is determined to relay said received message to said fixed address.

6. The session control server according to claim 5,
wherein said control server further includes:
a session state management unit for managing the state of a communication session established between said communication terminals in a predetermined effective period of time;
a terminal location management unit for managing address information of said communication terminal notified through said network; and
a route specification confirmation unit for confirming whether or not a relaying route is specified for a received message.

7. A session control server disposed in a network system having a hierarchical structure formed with a set of a parent domain and a sub-domain, said server comprising:
an interface for sending/receiving a message;
a communication control unit for receiving and analyzing a received message, then shaping the header of said received message to transfer said received (message) having said shaped header to said interface;
a destination determination unit for determining whether or not the address of said received message belongs to any domain said server manages;
a fixed destination solution unit for relaying said received message to a specific fixed address; and
a location management unit for managing a pair of a public address to be opened to external by the source user of said received message and a user address used locally in said sub-domain,
wherein said specific fixed address is the address of another session control server disposed in a parent domain.

8. The session control server according to claim 7,
wherein said session control server sets a pair of a public address to be opened to external by said sub-domain user and a user address used locally in said sub-domain in said location management unit fixedly as location service information.

9. The session control server according to claim 7,
wherein said control server monitors changes of said location service information used to manage a pair of a user address and a contact address to set said user address in a contact header and sets a parent domain address in said source header as a public address domain name if said location service information changes, thereby registering said location service information in a session control server disposed in said parent domain with use of an SIP (Session Initiation Protocol) REGISTER message.

10. A control program used for a server having a function for controlling a communication session with use of an SIP (Session Initiation Protocol) established between at least two communication terminals, said program executing:
a step of confirming whether or not a received message has a specified route;
a step of confirming whether or not said received message is addressed to a domain said server manages if said received message has no specified route;
a step of solving the address of said received message by searching the location service information used to relay said message if said message is addressed to a domain said server manages;
a step of confirming whether or not a server operation mode is set if said message is addressed to a domain said server does not manage;
a step of relaying said message to a preset fixed address if a server operation mode is set; and
a step of solving the address of the server disposed in a domain set in said address by searching it in the DNS, thereby relaying said message if no server operation mode is set,
wherein said preset fixed address is the address of another session control server disposed in a parent domain.

* * * * *